United States Patent [19]

Shimizu et al.

[11] Patent Number: 5,522,970
[45] Date of Patent: Jun. 4, 1996

[54] DISTILLING TUBE APPARATUS

[75] Inventors: Yutaka Shimizu; Yoshiyuki Otsuka, both of Tokyo-to; Yoshihiko Hiraga; Atsushi Tanigawa, both of Osaka; Masayuki Kobayashi, Okayama, all of Japan

[73] Assignee: Japan Gore-Tex, Inc., Japan

[21] Appl. No.: 352,726

[22] Filed: Dec. 2, 1994

[30] Foreign Application Priority Data

Dec. 7, 1993 [JP] Japan .................................. 5-306876

[51] Int. Cl.$^6$ ...................................................... B01D 3/04
[52] U.S. Cl. .................. 202/197; 159/903; 159/DIG. 27; 159/DIG. 28; 210/500.23; 210/500.27; 202/267.1
[58] Field of Search .................................. 203/DIG. 1, 86, 203/39, 40, 89, DIG. 16; 202/267.1, 182, 234, 197, 200; 159/DIG. 27, DIG. 28, 903, 904; 210/640, 500.23, 500.27

[56] References Cited

U.S. PATENT DOCUMENTS

| | | | |
|---|---|---|---|
| 3,563,860 | 2/1971 | Henderyckx | 159/DIG. 27 |
| 3,661,721 | 5/1972 | Rodgers | 159/DIG. 27 |
| 3,785,931 | 1/1974 | Coffey et al. | 203/DIG. 1 |
| 4,178,715 | 12/1979 | Greenbaum | 47/58 |
| 4,596,659 | 6/1986 | Nomura | 210/669 |
| 4,620,900 | 11/1986 | Kimura et al. | 159/DIG. 27 |
| 4,666,883 | 5/1987 | Nomura | 502/402 |
| 4,698,135 | 10/1987 | Raab | 159/DIG. 27 |
| 4,718,985 | 1/1988 | Kjellander | 159/DIG. 27 |
| 4,728,397 | 3/1988 | Kjellander et al. | 159/DIG. 27 |
| 4,778,569 | 10/1988 | Ostertag | 159/DIG. 27 |

FOREIGN PATENT DOCUMENTS 0238941  3/1987  European Pat. Off. .

Primary Examiner—Robert J. Warden
Assistant Examiner—Robert Carpenter
Attorney, Agent, or Firm—E. Alan Uebler

[57] ABSTRACT

Distilling tube apparatus for converting salt water such as sea water into fresh water is provided. The apparatus includes a first tube through which a feed stream of heated salt water is caused to flow, the first tube being constructed of a porous material which is both water-vapor permeable and liquid water impermeable, which tube allows water vapor to permeate through its walls thereof when heated salt water flows therethrough, the vapor then condensing outside of the first tube upon cooling of the vapor thereat. This first tube is preferably constructed of porous, expanded polytetrafluoroethylene. A second tube oriented in generally parallel relationship and in close proximity to the first tube is provided through which cooling water is caused to flow. The cooling water is maintained at a temperature lower than that of the heated salt water, thereby resulting in a lowering of the temperature of the surroundings of the second tube and providing an enhanced driving force for distillation of the salt water. A third housing tube is provided which houses both the first tube and the second tube within its interior. This housing tube has a plurality of spaced apart openings in the wall thereof to permit fresh water which has condensed externally to the first tube and within the housing tube to flow through these openings and thence outwardly of the distilling tube apparatus.

3 Claims, 2 Drawing Sheets

DISTILLING TUBE APPARATUS

FIELD OF THE INVENTION

The present invention relates to a fresh water generator for producing fresh water from salt water, brackish water or otherwise raw or nonfresh water. Specifically, fresh water can be produced from sea water for use as irrigation water. More specifically, distilling tube apparatus is provided involving the use of a vapor-permeable and water impermeable material that is suitable for use in such fresh water generators.

BACKGROUND OF THE INVENTION

The conversion of sea water into fresh water for use as irrigation water has been studied for the greening of deserts or the cultivation of agricultural crops in arid regions, and the use of fresh water generators such as those depicted in FIGS. 5 and 6 have been proposed for irrigation facilities. These are systems in which a single distilling tube 1, formed using a vapor-permeable membrane having the physical property of liquid water impermeability but allowing water vapor to permeate, is buried in the ground in regions that are to be irrigated. Sea water 2 is stored in a tank 3 where it is typically heated to about 50 degrees C. by a solar collector 4, for example, and the heated sea water 2 is fed under pressure by a pump 5 and circulated to the distilling tube 1. In this fresh water generator, simply heating the sea water 2 and feeding it under pressure to the distilling tube 1 allows the sea water 2 to be converted to vapor as a result of the difference between the temperature of the heated sea water itself and the temperature in the surrounding ground. The vapor permeates the material comprising the distilling tube 1 and is exuded into the ground, where it is immediately cooled and condensed, thus watering the ground in the form of distilled water, that is, fresh water. Fresh water is thus naturally generated by the aforementioned distilling tube 1 and immediately supplied into the ground. The salt component and other components in the sea water 2 cannot permeate the distilling tube 1 and are thus gradually concentrated and collected in tank 3.

Because the raw water 2 is heated to about 50 degrees C. and fed under pressure to the distilling tube 1 in the aforementioned fresh water generator, the temperature in the ground surrounding the distilling tube 1 gradually increases to nearly the same temperature as the feed water 2, leading to concerns over the deleterious heating effects on the roots of the crops as well as the other drawback that adequate distillation efficiency (driving force resulting from actual temperature difference) is not necessarily achieved.

The distillation efficiency of the distilling tube 1 is affected by the difference between the temperature of the sea water 2 and the temperature in the ground surrounding the distilling tube 1. The greater the difference in temperature, the more efficient is the distillation. Although an adequate difference in temperature is maintained initially in the known fresh water generator, continuous long term operation results in the gradual increase of the temperature in the ground surrounding the distilling tube 1 and the gradual decrease in the difference in temperature with the sea water 2, ultimately leading to markedly diminished distillation efficiency and the inability to obtain adequate amounts of fresh water for supply. As a consequence, the aforementioned prior device must be run intermittently by stopping operations when the temperature in the surrounding ground has increased sufficiently and the distillation efficiency has decreased, waiting for the surroundings to cool off sufficiently, and then resuming operations. This system thus cannot maintain demand when large amounts of fresh water must be supplied in a short period of time, and the overall distillation efficiency is not adequate. Such distillation apparatus is disclosed, for example, in European Patent Application No. 871035663, filed Mar. 3, 1987.

Other devices for producing fresh water from salt water or otherwise contaminated water are disclosed in U.S. Pat. Nos. 4,698,135; 4,666,883; 4,596,659 and 4,178,715.

SUMMARY OF THE INVENTION

The present invention provides distilling tube apparatus which can be used as a fresh water generator for converting salt or otherwise raw water such as sea water into fresh water. The apparatus includes a salt water supply tube formed of a material which is water-vapor-permeable but which does not allow liquids such as water to permeate therethrough. When the salt water flowing through the tube is heated to a prescribed temperature, vapor permeating the tube walls is condensed outside the tube in the form of fresh water. A second cooling water tube is provided in which cooling water maintained at a temperature lower than that of the aforementioned heated salt water flows so that its surroundings are maintained at a lower temperature. An external tube houses both the salt water tube and the cooling water tube and has run off openings formed on the peripheral surface to allow the fresh water that has condensed on the outside of the salt water tube to flow outwardly from the apparatus. The salt water supply tube is preferably made of porous, expanded polytetrafluoroethylene.

DETAILED DESCRIPTION OF THE INVENTION AND PREFERRED EMBODIMENTS WITH REFERENCE TO THE DRAWINGS

Distilling tube apparatus for converting salt water such as sea water into fresh water is provided. The apparatus includes a first tube through which a feed stream of heated salt water is caused to flow, the first tube being constructed of a porous material which is both water-vapor permeable and liquid water impermeable, which tube allows water vapor to permeate through its walls thereof when heated salt water flows therethrough, the vapor then condensing outside of the first tube upon cooling of the vapor thereat. This first tube is preferably constructed of porous, expanded polytetrafluoroethylene. A second tube oriented in generally parallel relationship and in close proximity to the first tube is provided through which cooling water is caused to flow. The cooling water is maintained at a temperature lower than that of the heated salt water, thereby resulting in a lowering of the temperature of the surroundings of the second tube and providing an enhanced driving force for distillation of the salt water. A third housing tube is provided which houses both the first tube and the second tube within its interior. This housing tube has a plurality of spaced apart openings in the wall thereof to permit fresh water which has condensed externally to the first tube and within the housing tube to flow through these openings and thence outwardly of the distilling tube apparatus.

The distilling tube apparatus of the present invention is generally in the form of a multiple tube structure in which the salt water tube and the cooling water tube are bundled together and housed inside the external housing tube. The salt water tube is formed in the same manner as a conventional distilling tube using a vapor-permeable, water impermeable membrane as the material. When salt water heated to a prescribed temperature flows into this tube, the salt water is converted into vapor, permeates the walls of the tube, and is exuded to the outside of the salt water tube. The water vapor thus exuded condenses in the form of fresh water within the interior of the external housing tube and flows out through run off openings formed in the external housing tube to the outside. To enhance this process, cooling water having a temperature lower than that of the salt water is flowing in the cooling water tube, so that the ambient temperature surrounding the salt water tube is always kept at a low temperature, thereby providing a desired difference in temperature maintained between the salt water and the surroundings, thereby preventing diminished distillation efficiency so as to make long term continuous operation possible.

Figure 1:
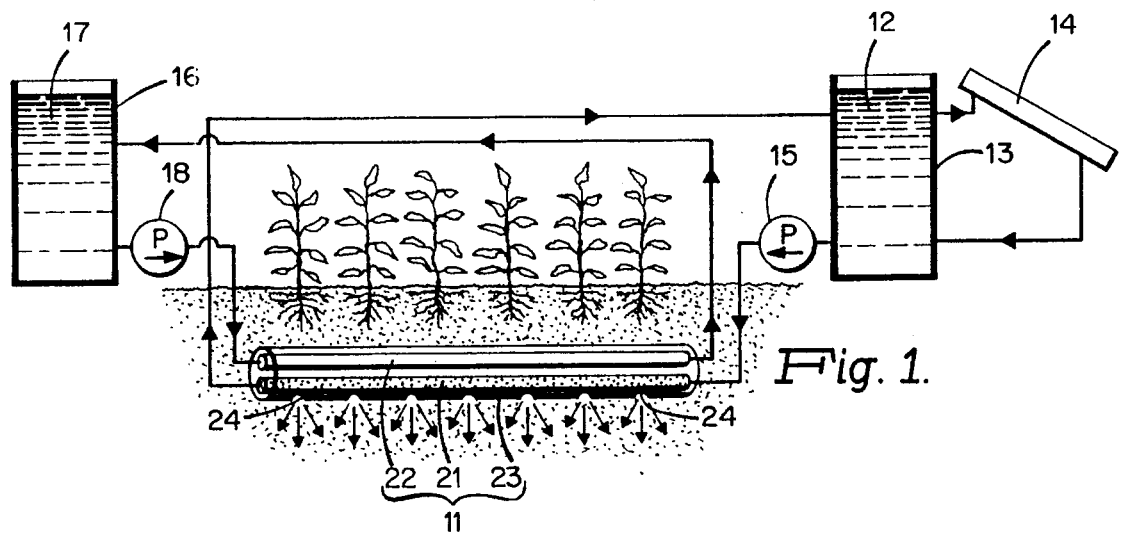
FIG. 1 is a schematic diagram depicting an example in which the distilling tube apparatus of the present invention is used as a fresh water generator for irrigation purposes.
Figure 2:
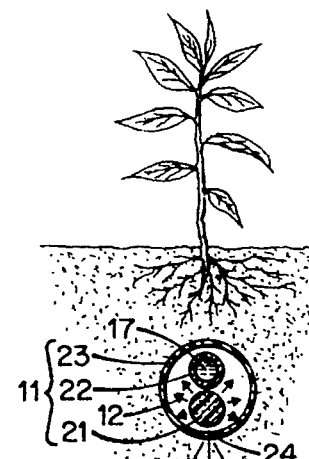
FIG. 2 is a cross section of the arrangement of the distilling tube apparatus shown in FIG. 1.

Examples according to the present invention are described below with reference to the accompanying figures. FIGS. 1 and 2 are schematic diagrams depicting a fresh water generator involving the use of the distilling tube apparatus according to the present invention. As shown in FIG. 1, the fresh water generator is designed to convert sea water into fresh water for use as irrigation water. Reference character 11 in the figure denotes the distilling tube apparatus of the present example which has been buried in a region intended for irrigation, 13 denotes a salt water tank used to store sea water as the feed water 12, 14 is a solar collector for heating the salt water 12 in the salt water tank 13, and 15 is a salt water pump which is used to circulate the salt water 12 in the salt water tank 13 under pressure to the distilling tube apparatus 11. Symbol 16 denotes the cooling water tank where the cooling water 17 is stored, and 18 is a cooling water pump which is used to circulate the cooling water by compression to the distilling tube apparatus 11.

The distilling tube apparatus 11 in the present example is a multiple tube structure including a salt water tube 21, through which heated salt water 12 flows, and a cooling water tube 22, through which cooling water 17 flows, both tubes being bundled together and housed inside external tube housing 23. The salt water tube 21 is formed in the same manner as a conventional distilling tube 1 using a vapor permeable, water impermeable material. Salt water 12 heated to a prescribed temperature of about 50 degrees C., for example, flows from the salt water tank 13 through the salt water tube 21. The cooling water tube 22 is formed using a water-impermeable material, and cooling water 17, maintained at a temperature lower than that of the salt water 12, at about 20 degrees C. for example, flows from the cooling water tank 16 through the cooling water tube 22 counter to the salt water 12. In the present example, sea water at its normal temperature was stored in large amounts in the cooling water tank 16 and circulated for use as the cooling water 17. The external housing tube 23 in which the salt water tube 21 and cooling water tube 22 had been bundled and housed was made in the same manner as the cooling water tube 22 using a common water-impermeable material as the material of construction. Numerous holes were formed at prescribed intervals along the underside of tube 23 as run off openings 24 to allow the fresh water obtained by means of the apparatus to flow to the outside for irrigation purposes.

Suitable materials of construction for the water tank 13 and cooling water tank 16 include polyethylene, polypropylene, polyvinylchloride, and FRP, with the preferred material being high density polyethylene. Suitable materials of construction for the tube 21 include hydrophobic porous polymeric materials such as polypropylene, polyethylene, and polytetrafluoroethylene, with the preferred material being porous, expanded polytetrafluoroethylene, optionally reinforced with non-woven fabric, netting, and the like. Suitable materials for the tube 22 include polypropylene, polyethylene, polyvinylchloride, and polyurethane, with the preferred material being polyethylene. For the housing tube 23, suitable materials include polypropylene, polyethylene, and polyvinylchloride, with the preferred material being polypropylene.

Figure 5:
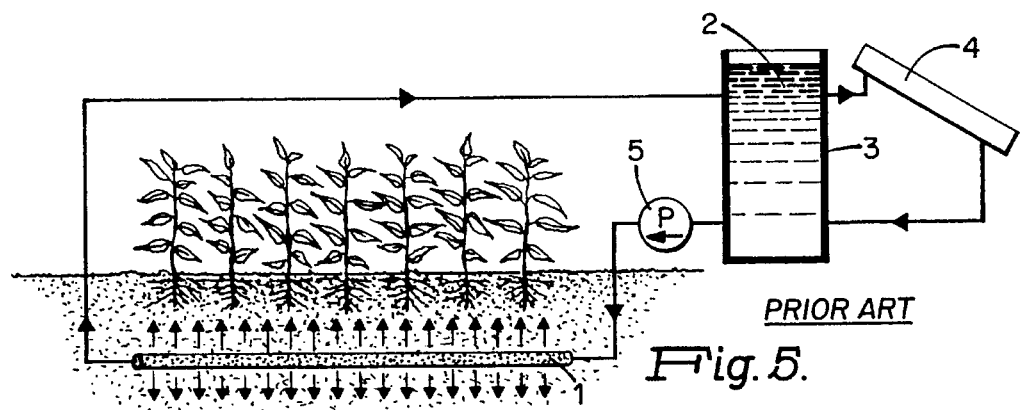
FIG. 5 is a schematic diagram depicting distilling tube apparatus of the prior art used as a fresh water generator for irrigation facilities.
Figure 6:
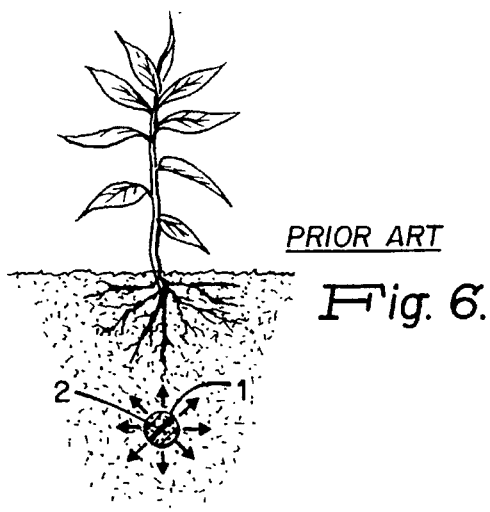
FIG. 6 is a cross section of the arrangement of the distilling tube apparatus of FIG. 5.

In the above desalination tube apparatus 11, when warmed salt water 12 is passed through the salt water tube 21, the salt water permeates as vapor through the surrounding surface into the outside surroundings of the salt water tube 21 (inside the external housing tube 23), and the permeated vapor condenses there into desalinated water. This distilled water exits through the outlet openings 24, formed in the walls of external housing tube 23 as shown, and penetrates into the ground. In this case, as the cooling water 17, which is lower in temperature than the salt water 12, is passed through cooling water tube 22, the surrounding temperature of the cooling water tube 22 is constantly kept low, thereby creating a desired substantially constant temperature difference between the salt water tube 21 and its surroundings. Thus the desalination function of the salt water tube 21 is continuously achieved. In the traditional desalinating tube 1 (FIG. 5), as the surrounding temperature gradually rises, the desalination function is gradually lowered. For comparison, in the desalinating tube apparatus 11 in the present example, this phenomenon is prevented, thereby enabling extended continuous operation. Moreover, excessive rise in the surrounding ground temperature is suppressed by the cooling water tube 22, so that the deleterious effects caused by heat on the roots of agricultural plants is prevented.

The present invention is not limited to the above example, and the various following modifications and applications are possible.

For example, one salt water tube 2 and one cooling water tube 22 were housed in parallel relationship inside the external housing tube 23 as in the above example, but a plurality of either or both of the salt water tube 21 and cooling water tube 22 were used, and they were spirally coiled and bundled. It is more advantageous from the stand point of cooling efficiency to have the salt water 12 and cooling water 17 run counter to each other, as in the aforementioned example, but no restrictions are necessarily imposed on doing so, and they may also flow parallel to each other.

Figure 3:
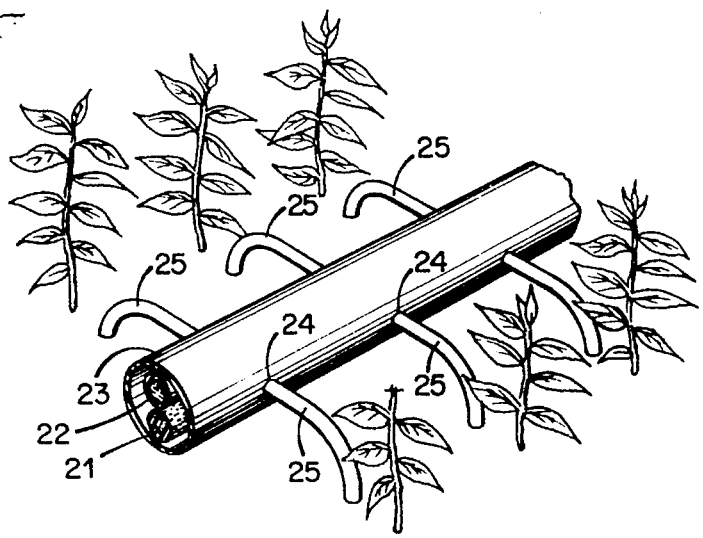
FIG. 3 is an illustration depicting an example of another embodiment of the distilling tube apparatus of the example of FIG. 1 installed above ground level.

The run off openings 24 were fashioned in the form of small holes along the underside of the external housing tube 23 in the example above, but these run off openings 24 may also be provided over the entire periphery and lengthwise of the external tube 23. Their shape is not limited to that of small holes; they may also be in the form of slits or other shape. The use of an external tube 23 made of a material that is strong enough to protect and support the salt water tube 21 and the cooling water tube 22 allows the distilling tube apparatus 11 to be arranged on the surface of the ground as well, without being buried in the ground, and also allows it to be built so that it can be suspended in the air without substantial sagging. FIG. 3 depicts an application in which the distilling tube apparatus 11 is arranged on the surface of the ground and in which hoses 25 are connected to the run off openings 24 so that the fresh water obtained by means of the distilling tube apparatus 11 is supplied through the hoses 25 directly to the roots of the plants.

The heat source for the salt water 12 is not limited to the solar collector 14, and other heating sources such as direct heaters can also be used. The distilling tube apparatus according to the present invention may be used not only in fresh water generators for irrigation facilities, as in the example above, it can also generally be used for a wide range of fresh water generators in various other applications, such as fresh water generators used to manufacture fresh water such as drinking water on remote islands or on large ocean-going shipping vessels. The salt (raw) water is also not limited to sea water.

Figure 4:
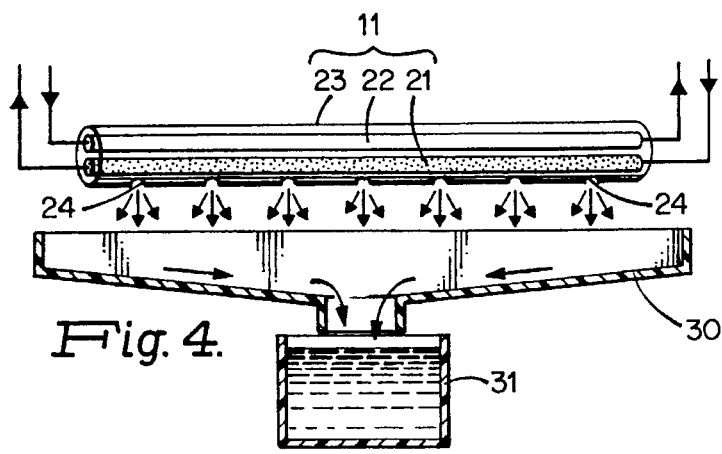
FIG. 4 is a schematic illustration depicting an application in which the distilling tube apparatus of the present invention is used as a fresh water generator.

As an example of another embodiment, FIG. 4 depicts an application in which the distilling tube apparatus 11 described in the example above is adapted to a common fresh water generator, in which the fresh water obtained using the tube apparatus 11 is received by troughs 30 and collected in a water collecting tank 31.

The following results were obtained when a test was conducted to determine the performance of the fresh water generator shown in FIG. 4. Salt water at 60 degrees C. and 20 degrees C. cooling water were allowed to flow counter currently to each other. Measurement of the amount of distilled water obtained by allowing the salt and cooling water to flow in the salt water tube 21 and the cooling water tube 22 revealed that the amount of distilled water per meter square of surface area of the salt water tube 21 was as much as about 15 L per hour. In contrast to this, the amount of distilled water per meter square was about 4 to 5 L per day with a conventional solar distiller of a type in which the liquid surface was covered with glass or transparent film. It was thus confirmed that the apparatus according to the present invention had improved performance over the conventional model.

As described above, the distilling tube apparatus according to the present invention is a structure in which a salt water tube fashioned using a porous, vapor-permeable, liquid water impermeable material and a cooling water tube through which cooling water flows are bundled together and housed within an external housing tube having run off openings. Allowing heated salt water to flow through the salt water tube permits vapor to permeate through the walls of the salt water tube which, upon condensation provides fresh water which can be taken out through the run off openings formed in the external housing tube. The cooling water at a temperature lower than that of the salt water flows in the cooling water tube and provides a suitable difference in temperature maintained between the salt water tube and its surroundings so that the distillation of the salt water can be continuously promoted without reducing the distillation efficiency. As a result, the present invention provides excellent results in that continuous long term distillation operations are made possible. It is therefore suitable for use in a variety of fresh water generation applications used to convert sea water and the like into fresh water.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Distilling tube apparatus for converting salt water into fresh water comprising:

(a) a source of heated salt water;

(b) a first means for pumping said heated salt water, said first pumping means in fluid communication with said source of heated salt water;

(c) a source of cooling water;

(d) a second means for pumping said cooling water, said second pumping means in fluid communication with said source of cooling water;

(e) a first tube in fluid communication with said source of heated water and said first pumping means, said tube constructed of a porous material which is both water-vapor-permeable and liquid water impermeable, which tube allows water vapor to permeate through it when said heated salt water flows therethrough, said vapor condensing outside of said first tube upon cooling of said vapor thereat;

(f) a second tube, in fluid communication with said source of cooling water and said second pumping means, through which cooling water flows, said second tube oriented in generally parallel relationship and in close proximity to said first tube, said cooling water being maintained at a temperature lower than that of said heated salt water, thereby resulting in a lowering of the temperature of the surroundings of said second tube; and (g) a third housing tube which houses both said first tube and said second tube within its interior thereof, said housing tube having a plurality of spaced apart openings in a wall thereof to permit fresh water which has condensed externally to said first tube and within said housing tube to flow through said openings and outwardly of said distilling tube apparatus.

2. The apparatus of claim 1 wherein said first tube is constructed from a porous material selected from the group consisting of porous polyethylene, porous polypropylene and porous polytetrafluoroethylene.

3. The apparatus of claim 1 wherein said first tube is constructed of porous, expanded polytetrafluoroethylene.

* * * * *

REEXAMINATION CERTIFICATE (3573rd)

United States Patent [19]

Shimizu et al.

[11] B1 5,522,970
[45] Certificate Issued Jul. 14, 1998

[54] DISTILLING TUBE APPARATUS

[75] Inventors: Yutaka Shimizu; Yoshiyuki Otsuka, both of Tokyo-to; Yoshihiko Hiraga; Atsushi Tanigawa, both of Osaka; Masayuki Kobayashi, Okayama, all of Japan

[73] Assignee: Japan Gore-Tex, Inc., Japan

Reexamination Request:
No. 90/004,612, Apr. 24, 1997

Reexamination Certificate for:
Patent No.: 5,522,970
Issued: Jun. 4, 1996
Appl. No.: 352,726
Filed: Dec. 2, 1994

[30] Foreign Application Priority Data

Dec. 2, 1994 [JP] Japan ............... 5-306876

[51] Int. Cl.$^6$ ............... B01D 3/04
[52] U.S. Cl. ............... 202/197; 159/903; 159/DIG. 27; 159/DIG. 28; 210/500.23; 210/500.27; 202/267.1
[58] Field of Search ............... 202/197, 267.1; 159/903, DIG. 27, DIG. 28; 210/500.23, 500.27

[56] References Cited

U.S. PATENT DOCUMENTS

3,454,470  7/1969  Guarino ............... 202/177
4,698,135  10/1987  Raab ............... 202/234
4,778,569  10/1988  Ostertag ............... 203/49

*Primary Examiner*—Robert J. Warden

[57] ABSTRACT

Distilling tube apparatus for converting salt water such as sea water into fresh water is provided. The apparatus includes a first tube through which a feed stream of heated salt water is caused to flow, the first tube being constructed of a porous material which is both water-vapor permeable and liquid water impermeable, which tube allows water vapor to permeate through its walls thereof when heated salt water flows therethrough, the vapor then condensing outside of the first tube upon cooling of the vapor thereat. This first tube is perferably constructed of porous, expanded polytetrafluorocthylene. A second tube oriented in generally parallel relationship and in close proximity to the first tube is provided through which cooling water is caused to flow. The cooling water is maintained at a temperature lower than that of the heated heated salt water, thereby resulting in a lowering of the temperature of the of the second tube and providing an enhanced driving force for distillation of the salt water. A third housing tube is provided which houses both the first tube and the second tube within its interior. This housing tube has a plurality of spaced apart openings in the wall thereof to permit fresh water which has condensed externally to the first tube and within the housing tube to flow through these openings and thence outwardly of the distilling tube apparatus.

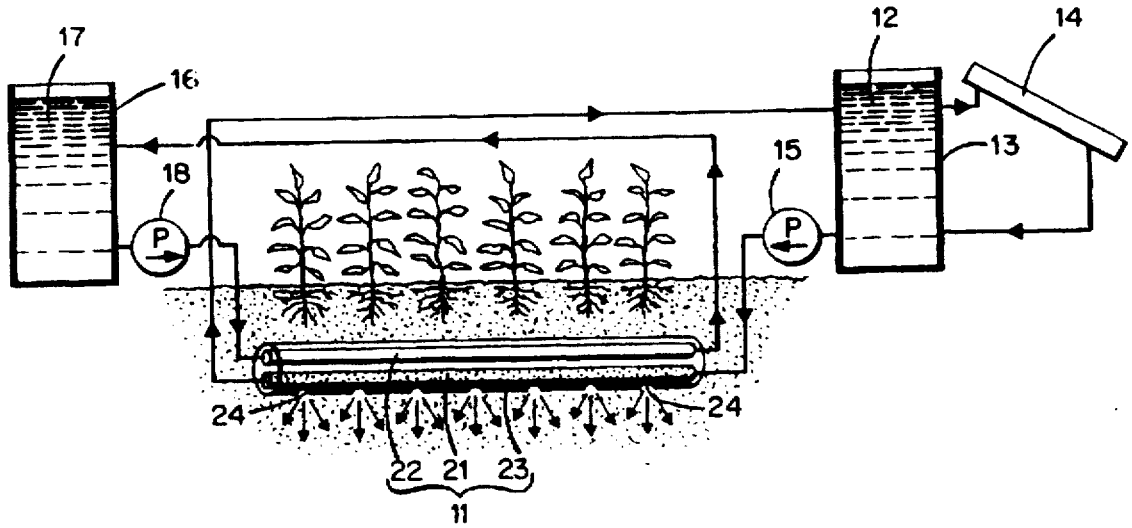

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

New claim 4 is added and determined to be patentable.

4. *The apparatus of claim 1 wherein said housing tube is maintained at ambient pressure and temperature and open to the atmosphere through said spaced apart openings.*

* * * * *